Figure 1:
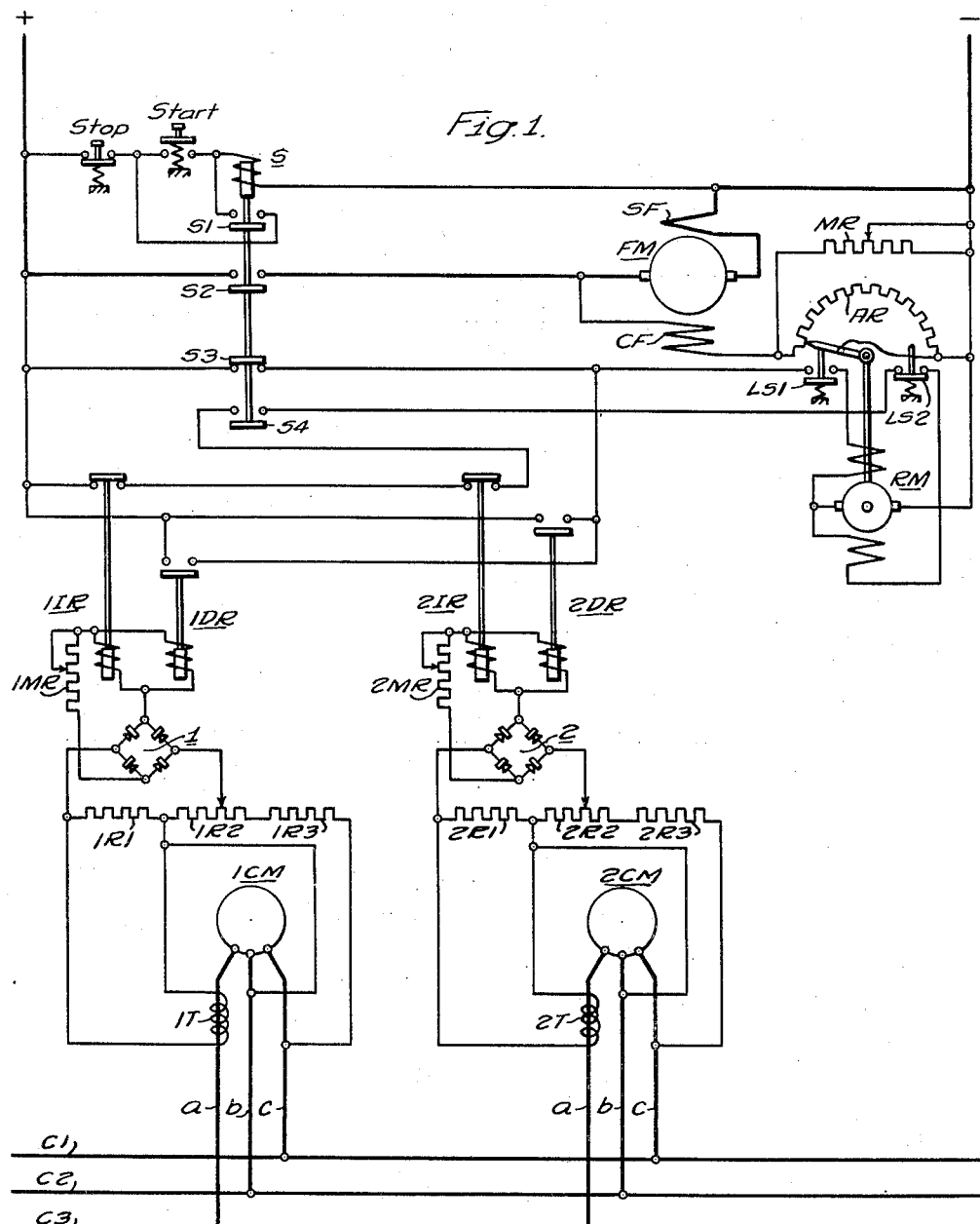

Patented Dec. 20, 1949

2,491,983

UNITED STATES PATENT OFFICE 2,491,983

CONTROL SYSTEM

George E. King and Louis W. Herchenroeder, Pittsburgh, Pa., assignors to Westinghouse Electric Corporation, East Pittsburgh, Pa., a corporation of Pennsylvania Application November 19, 1945, Serial No. 629,656

2 Claims. (Cl. 318—39)

This invention relates generally to electrical systems, and, more particularly, to electrical systems embodying a multiplicity of electrical loads in which the electrical characteristics of such loads are utilized to produce control quantities, which quantities either together or individually are utilized to introduce certain desired corrections into the system.

In certain of its aspects this invention is of general utility and may be effectively utilized in electrical systems embodying a plurality of electrical output points in which a control of the system, a control of certain of its elements or a single element is desired depending upon the electrical load at said output points.

This invention is generally related to the copending applications of George E. King, Serial Nos. 566,722, Patent No. 2,443 656, issued June 22, 1948, and 566,723, Patent 2,411,162, issued November 19, 1946, each entitled Control system, and each filed on December 5, 1944. Both copending applications are assigned to the same assignee as this invention.

The invention by way of illustration but not limitation is illustrated in the drawings as applicable to a feed control system for a milling machine. In a milling machine drive it is desirable to limit the load on the cutters thereof, since, an overload on any one cutter may cause cutter failure, thus necessitating shutdown of the machine. This is undesirable both from the operating point of view and the expense involved in cutter failure. Also in order to get the maximum production from a given machine it is desirable to operate the cutters at loads close to their maximum load without the attendant danger of cutter failure. In the usual practice a milling machine may have from one to four cutters, each driven by an alternating current squirrel cage motor. The work is ordinarily fed into the cutters by an adjustable speed direct current motor, i. e., the cutter spindles are usually stationary, and the work piece is fed into the cutters by one feed motor. Heretofore, the cutters have usually been protected by current relays set to operate at about 150% of full load cutter motor current. One relay was connected in each cutter motor circuit, and the contacts were connected so that if any relay operated, it stopped the feed motor. Still other arrangements are available wherein a continuous control of the feed motor is had using the cutter motor load current as the control reference.

While all these schemes embody desirable control features, particularly over the cutter load range approaching the maximum load of the cutter motor, they generally lack the sensitivity necessary to protect delicate cutters which can absorb only a fraction of the output of the cutter motors. This results from the fact that while the load current of the cutter motors follows substantially the pattern of the developed power curve beyond certain minimum loadings, a marked deviation of the load current and power curves below such loadings results, the rate of change of the curve of load current becoming less and less as zero power is approached.

The load current comprises essentially two components, one a power current component which is in phase with the phase voltage, and the other a magnetizing current component which is substantially in quadrature with the power current. The power current represents the power input to the motor and fairly accurately represents the power output of the cutter motor over its normal operating range. The magnetizing current is substantially constant over the operating range of the motor. Thus the magnetizing component of load current becomes the increasingly predominating factor as zero power is approached and introduces error into any control utilizing load current as the control reference. On the other hand the power current alone offers a reasonably accurate control reference, since, its characteristics closely follow the motor's power output characteristics over the normal operating range.

The principal object of this invention is to provide a simple arrangement for producing a control quantity representative of the power input to or output of a polyphase electrical load.

Another object of this invention is to provide an electrical system, in which the electrical characteristics of any one or all of a group of electrical loads may be utilized to produce a regulating quantity, which regulating quantity is utilized to effect a control of the system.

More specifically it is an object of this invention to provide an electric drive in which the electrical characteristics of any one or all of a group of elements may be utilized to regulate an element to be controlled.

Yet another object of this invention is to provide an electrical system in which an electrical loading which is a departure from a selected loading on one electrical load or any one or all of a group of electrical loads is utilized to effect a control tending to maintain the selected loading.

A further object of this invention is to provide an electric drive for effecting relative movement between one element or a group of elements and an element to be controlled in which the rate of relative movement is controlled depending upon the departure from a selected value of the load of said one element or any one or all of said group of elements.

A still further object of this invention is to provide an electric drive for effecting a control of the speed of one motor depending upon the departure in loading from a predetermined loading of any one or all of a group of motors in which the motors of said group may be unequally loaded.

Yet a further object of this invention is to provide a control for a machine tool which provides highly efficient machine tool operation.

Figure 2:
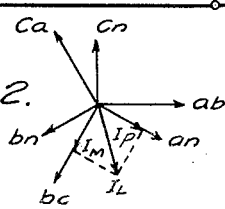

The foregoing objects are merely illustrative of the various aims and objects of this invention. Other objects and advantages will become apparent upon a study of the following disclosure when considered in conjunction with the accompanying drawing, in which:

Figure 1 illustrates an electric drive embodying the principles of this invention; and Fig. 2 is a vector diagram illustrating the theoretical aspects of the invention.

The basic elements of the electric drive are the feed motor FM which by driving the bed upon which the work piece is fastened determines the rate of feed of the work piece with respect to the cutters, and the cutter motors 1CM and 2CM. In the interest of simplicity two cutter motors are illustrated; however, one or more cutter motors may be used together with their system controlling relays for effecting a further control of the feed motor FM.

The speed of the feed motor FM is controlled by varying the excitation of its control field CF. Manually operated rheostat MR limits the field weakening of the control field and, hence, determines the maximum speed of the motor FM. Automatic rheostat AR controlled by reversible regulating motor RM provides a means for varying the speed of the motor through automatic field excitation control in response to control intelligences available at the resistor networks associated with each cutter motor.

In the instant case actual response to the control intelligence at the resistor networks is had in the medium of control relays 1IR, 1DR, and 2IR, 2DR respectively for the cutter motors 1CM and 2CM. Relays 1IR and 2IR cooperate upon the occurrence of minimum voltage across each of the rectifiers 1 and 2 to energize the regulating motor RM, causing it to drive the sweep arm of the automatic rheostat in a direction to insert resistance in the motor control field CF, thereby weakening the field CF and increasing the feed motor's speed. Relays 1DR and 2DR independently energize the regulating motor in a reverse direction to cause operation of the sweep arm of the automatic rheostat to shunt resistance from the control field, increasing that field's strength and decreasing the speed of the feed motor. Direct current for energizing the feed motor and regulating motor is supplied by the positive and negative busses identified by the plus and minus signs, the armature and series field winding SF and the control field winding CF of the feed motor being connected across the positive and negative busses by the contacts S2 of the main switch S. The regulating motor, to insure starting of the feed motor at slow speed, is connected across the positive and negative busses through contacts S3 and limit switch LS1 to effect shunting of the rheostat AR to apply full field to the motor when switch S is deenergized. For normal running of the feed motor the regulating motor is energized through contacts S4 together with the contacts of both relays 1IR and 2IR, or alternatively, either of the contacts 1DR and 2DR and the limit switches in circuit therewith. A supply of three phase alternating current for energizing the cutter motors 1CM and 2CM is provided through conductors a, b and c through supply conductors C1, C2 and C3.

Control relays 1IR and 1DR are connected in parallel with the output terminals of full wave rectifier 1 while control relays 2IR and 2DR are connected in parallel with the output terminals of full wave rectifier 2. Rheostats 1MR and 2MR provide means for adjusting the voltage available at the respective rectifier terminals which is to be applied to the control relays, thereby providing independent settings of the loads the cutter motors are to carry. The voltage applied to the input terminals of rectifier 1 is taken from the resistors 1R1 and 1R2 while that applied to rectifier 2 is taken from resistors 2R1 and 2R2. Resistors 1R1 and 2R1 are respectively energized by the output of current transformers 1T and 2T each of which are connected in one line of the supply for the respective cutter motors, while resistors 1R2 and 2R2 are respectively connected in a circuit including series resistors 1R3 and 2R3 across two lines b and c of the supply for the respective cutter motors in which the voltage is substantially in phase with the magnetizing component of the load current in the line in which the transformers 1T and 2T are connected. The resistors 1R1 and 1R2 are so connected and similarly resistors 2R1 and 2R2 are so connected that the portion of the voltages across the resistors 1R1 and 2R1 caused by the magnetizing or quadrature current components of the load current are substantially balanced out or neutralized. Thus the remaining quantity which energizes the control relays is indicative of the power current supplied to the cutter motors which in turn is roughly proportional to the power output of the particular motor over its normal working range. The amount of neutralizing voltage which is to be applied to the respective control circuits is conveniently set by varying the setting of the adjustable taps along the resistors 1R2 and 2R2.

A better understanding of the invention will probably be had upon a consideration of the fundamental theory underlying this invention as expressed in the vector diagram of Fig. 2. The invention is predicated upon the fact that the power current supplied to a motor such as 1CM is substantially proportional to the output power of the motor over the normal working range. Thus in a control arrangement wherein the loading of a particular element of the system is to be held within a certain range of values, the power current supplied to that element provides a suitable control reference. Since the load current comprises essentially two components of current, one the power current and the other the magnetizing current, some means must be provided to eliminate or neutralize the effect of the magnetizing current. This invention accomplishes that end by producing an electrical quantity having a magnitude and phase angle corresponding to the magnetizing component of the load current quantity and subtracting such quantity from the load current quantity. That this may readily be accomplished in a simple three phase Y-connected system is apparent from Fig. 2 although it is not to be construed the system is limited to a Y-connected system. Here the three vectors $ab$, $bc$, and $ca$ represent the line voltages. The line to neutral or phase voltages are represented by the vectors $an$, $cn$ and $bn$. The line current or load current of line $a$ is represented by the vector $I_L$ and results essentially from the vectoral addition of the inphase component or power current $I_p$ which is inphase with the phase voltage and the quadrature component or magnetizing current $I_M$ which in the theoretical case is inphase with the line voltage $bc$. Thus it is possible to obtain a control voltage indicative of the power current by selecting any necessary proportion of the line voltage $bc$ as by the voltage drop across resistors IR2 or 2R2 and subtracting it from the voltage appearing across resistors IRI or 2RI, which voltage is proportional to load current.

The operation of the system is as follows: Rheostats IMR and 2MR are set to provide the required loading of each of the cutter motors ICM and 2CM. Rheotat MR is then adjusted to provide the desired maximum feeding speed. Conductors CI, C2 and C3 are then energized (by any conventional means not shown) and the cutter motors started. Energization of the positive and negative busses starts the regulating motor RM which drives the automatic rheostat sweep arm to the position shown in which substantially all of the automatic rheostat is shunted from the circuit thus setting the motor field at its maximum excitation for the particular setting of the manual rheostat MR. This energizing circuit for the regulating motor includes the positive bus, the now closed contacts S3, limit switch LSI and the regulating motor to the negative bus. Limit switch LSI opens the regulating motor energizing circuit when the automatic rheostat is all out. In practice, as a protective measure to prevent operation of the switch S until the automatic rheostat AR is in the position illustrated, a reset interlock on the rheostat AR in series with the Start push button may be provided. Such an arrangement, however, deals with conventional protective measures and in the interest of simplicity is not illustrated. Pressing of the Start push button energizes the main switch S in a circuit across the positive and negative conductors including the Stop push button. Closure of contacts SI completes a parallel energizing path for the coil of the main switch independent of the position of the Start push button. Contacts S2 connect the feed motor FM to the positive and negative conductors. The workpiece is now fed into the cutters driven by the cutter motors. Contacts S3 open and contacts S4 close thus transferring the energizing circuit for the regulating motor to the control relays.

The control relays are adjusted to have a differential between pickup and dropout to eliminate continuous operation of the regulating motor. That is the relays IIR and 2IR are set to drop out when a certain minimum voltage appears across the coils thereof and relays IDR and 2DR pick up when the voltage reaches a certain maximum value. These pickup and dropout voltages are sufficiently low that the cutter motors may be operated at minimum cutter load with sufficient control voltage available at the relay terminals to provide positive relay response to the control quantities. For example, assume the cutter motors are rated at 20 kilowatts and that cutter motor ICM is to be operated at a maximum load of 12 kilowatts while cutter motor 2CM is to be operated at a maximum load of 2 kilowatts. Rheostat IMR is adjusted so that a substantial portion thereof is inserted in the control relay circuit that when the 12 kilowatt loading of the motor ICM is reached just sufficient voltage will be applied to the terminals of the control relays to cause relay IDR to pick up. Relay IIR due to the differential setting of the relays responds to some lower energizing voltage and picks up. It may, for example, be set to drop out at about 9 kilowatts cutter motor load. Since the load on the cutter motor 2CM is quite low and the control voltages available at the resistor network correspondingly low the rheostat 2MR will be substantially entirely shunted from the control relay circuit that the necessary voltage for pickup of relay 2DR at the 2 kilowatt maximum loading of cutter motor 2CM will be available. Relay 2IR will drop out at some proportionally lower kilowatt value.

Assuming that on starting of the system both cutter motors are sufficiently lightly loaded that the relays IIR and 2IR lack the required operating voltage, then the contacts of these relays together with the contacts S4 of the main switch and limit switch LS2 energize the regulating motor RM in a direction to insert rheostat AR into the circuit of the control field CF, weakening the control field and causing the feed motor to speed up. This increases the rate of feed of the workpiece into the cutters and the loads on the cutter motors rise. Should the control voltage of either set of control relays rise above the pickup value for either of relays IIR or 2IR, the energizing circuit for the regulating motor is broken and the regulating motor stops. Upon the occurrence of maximum load on either of the cutter motors the associated relay IDR or 2DR responds and energizes the regulating motor in the reverse direction causing resistance to be shunted from the circuit of control field CF strengthening that field and slowing the feed motor to prevent cutter overload.

While this invention is illustrated in connection with a relaying system responsive to the control quantities afforded by the resistor networks, it is not to be construed that the invention is limited to this application. The invention may equally well be applied to provide the control quantities in both the copending applications hereinbefore mentioned. In general, the teachings of this invention may be applied in any alternating current electrical system in which a reasonably accurate determination of power or a control depending upon power values is desired.

The foregoing disclosure and the showings made in the drawing are merely illustrative of the principles of this invention and are not to be interpreted in a limiting sense. The only limitations are to be determined from the scope of the appended claims.

We claim as our invention:

1. In an electric control for regulating a first electroresponsive device depending upon an overload in anyone of a group of inductive electroresponsive devices, the combination of, means for supplying alternating electrical current to each inductive electroresponsive device of said group, circuit means for each inductive electroresponsive device responsive to the load current thereof for producing a first electrical quantity representative of the load current supplied thereto, each of said first electrical quantities comprising essentially two components of current, one a power current and the other a magnetizing current, said magnetizing current having a known magnitude and known phase relation to the power current, circuit means for producing a second electrical quantity for each inductive electroresponsive device of said group corresponding in phase and magnitude to the magnetizing current of the corresponding inductive electroresponsive device, circuit means for combining the corresponding first and second electrical quanties such that neutralization of the magnetizing currents in each case results in a power indicative electrical quantity for each inductive electroresponsive device having a value depending upon the magnitude of the power current thereof, electrical means responsive to a predetermined minimum value of all said power indicative electrical quantities for effecting a control of said first electroresponsive device, and electrical means responsive to a predetermined maximum value of the power indicative electrical quantities for also effecting a control of said first electroresponsive device.

2. An electric drive embodying a controlled motor and a plurality of independent motors comprising, in combination, circuit means for supplying polyphase electrical energy to each of said independent motors, circuit means for each independent motor responsive to the load current thereof for producing a first electrical quantity for each independent motor corresponding to the load current thereof, said load current comprising a magnetizing component of current and a power component of current, circuit means for eliminating said magnetizing component of current in each of said first electrical quantities and producing a power indicative electrical quantity for each of said independent motors, and control circuit means responsive to each of said power indicative electrical quantities for controlling said controlled motor.

GEORGE E. KING.
LOUIS W. HERCHENROEDER.

REFERENCES CITED

The following references are of record in the file of this patent:

UNITED STATES PATENTS

| Number | Name | Date |
| --- | --- | --- |
| 1,828,583 | Weiske et al. | Oct. 20, 1931 |
| 1,871,499 | Crago | Aug. 16, 1932 |
| 1,989,137 | Fitz Gerald | Jan. 29, 1935 |
| 2,247,506 | Kutcher et al. | July 1, 1941 |
| 2,406,782 | Lewis | Sept. 3, 1946 |
| 2,458,454 | Winther | Jan. 4, 1949 |